(12) United States Patent
Sakata et al.

(10) Patent No.: US 8,310,628 B2
(45) Date of Patent: Nov. 13, 2012

(54) PRODUCTION METHOD OF COLOR FILTER SUBSTRATE, PRODUCTION METHOD OF LIQUID CRYSTAL DISPLAY DEVICE, COLOR FILTER SUBSTRATE, AND LIQUID CRYSTAL DISPLAY DEVICE

(75) Inventors: Tohru Sakata, Osaka (JP); Yasuhiro Kohara, Osaka (JP); Masaharu Akitomo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 271 days.

(21) Appl. No.: 12/601,594

(22) PCT Filed: Apr. 24, 2008

(86) PCT No.: PCT/JP2008/057929
§ 371 (c)(1),
(2), (4) Date: Nov. 24, 2009

(87) PCT Pub. No.: WO2008/152864
PCT Pub. Date: Dec. 18, 2008

(65) Prior Publication Data
US 2010/0165266 A1 Jul. 1, 2010

(30) Foreign Application Priority Data

Jun. 11, 2007 (JP) .................................. 2007-154125

(51) Int. Cl.
*G02F 1/1333* (2006.01)
*G02F 1/1335* (2006.01)
*G02F 1/1339* (2006.01)
(52) U.S. Cl. ......... 349/106; 349/108; 349/110; 349/155
(58) Field of Classification Search .......... 349/106–110, 349/155
See application file for complete search history.

(56) References Cited

U.S. PATENT DOCUMENTS

| 5,748,266 | A | 5/1998 | Kodate |
| 6,147,729 | A * | 11/2000 | Kurauchi et al. ............. 349/106 |
| 6,281,960 | B1 * | 8/2001 | Kishimoto et al. ........... 349/156 |
| 2003/0043326 | A1 * | 3/2003 | Sawasaki et al. ............. 349/123 |
| 2005/0088606 | A1 | 4/2005 | Ashizawa et al. |
| 2005/0275768 | A1 * | 12/2005 | Tsubata et al. ................ 349/106 |

(Continued)

FOREIGN PATENT DOCUMENTS

CN     1611996 A     5/2005

(Continued)

OTHER PUBLICATIONS

International Search Report for PCT/JP2008/057929, mailed May 27, 2008.

(Continued)

*Primary Examiner* — Jessica M Merlin
(74) *Attorney, Agent, or Firm* — Nixon & Vanderhye P.C.

(57) ABSTRACT

The present invention provides a production method of a color filter substrate that can efficiently produce a color filter substrate including a multi-layer spacer. The production method of the color filter of the present invention is a production method of a color filter substrate including a colored layer, an electrode, a light-shielding layer, and a multi-layer spacer on a substrate,
the production method including the steps of:
forming the colored layer and a base colored layer of the multi-layer spacer,
forming the electrode, and
forming the light-shielding layer and a top layer of the multi-layer spacer.

12 Claims, 7 Drawing Sheets

U.S. PATENT DOCUMENTS

| | | | |
|---|---|---|---|
| 2007/0195214 A1* | 8/2007 | Chung et al. | 349/39 |
| 2008/0259267 A1 | 10/2008 | Ashizawa et al. | |
| 2008/0309859 A1 | 12/2008 | Tsubata | |
| 2009/0268148 A1 | 10/2009 | Ashizawa et al. | |

FOREIGN PATENT DOCUMENTS

| | | |
|---|---|---|
| JP | 2002-23170 A | 1/2002 |
| JP | 2002-258267 | 9/2002 |
| JP | 2003-222880 | 8/2003 |
| JP | 2003-228085 | 8/2003 |
| JP | 2006-023733 | 1/2006 |
| JP | 2006-267524 | 10/2006 |

OTHER PUBLICATIONS

Chinese Office Action and English translation thereof mailed Feb. 10, 2011 in Chinese application 200880014565.8.

* cited by examiner

Fig. 3
(a)
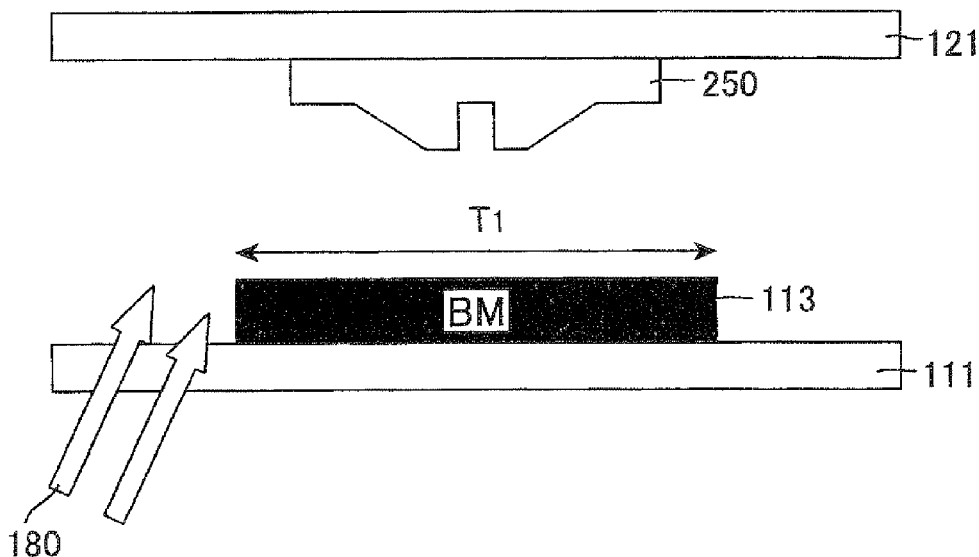
(b)
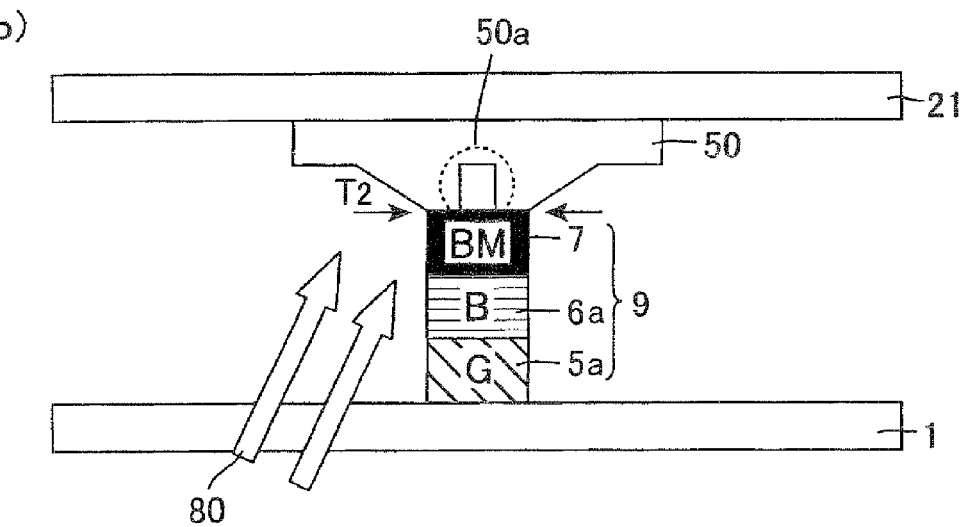
Fig. 4-1
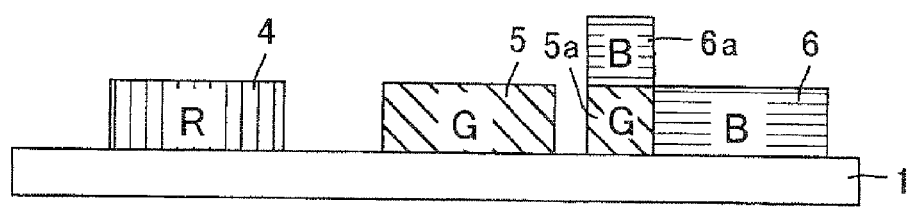

PRODUCTION METHOD OF COLOR FILTER SUBSTRATE, PRODUCTION METHOD OF LIQUID CRYSTAL DISPLAY DEVICE, COLOR FILTER SUBSTRATE, AND LIQUID CRYSTAL DISPLAY DEVICE

This application is the U.S. national phase of International Application No. PCT/JP2008/057929, filed 24 Apr. 2008, which designated the U.S. and claims priority to Japanese Application No. 2007-154125, filed 11 Jun. 2007, the entire contents of each of which are hereby incorporated by reference.

TECHNICAL FIELD

The present invention relates to a production method of a color filter substrate, a production method of a liquid crystal display device, a color filter substrate, and a liquid crystal display device. More particularly, the present invention relates to a production method of a color filter substrate preferably used when a multi-layer spacer is formed on a color filter substrate, and to a production method of a liquid crystal display device including a color filter substrate produced by the production method. The present invention also relates to a color filter substrate preferably prepared by the production method and a liquid crystal display device including the color filter substrate.

BACKGROUND ART

A color filter substrate is a member that includes colored layers of red (R), blue (B), green (G), and the like, which allows a display device such as a liquid crystal display device including the color filter substrate to provide color display. The liquid crystal display device provides display by controlling optical characteristics of light emitted from a light source using a liquid crystal layer included in a liquid crystal display panel. The liquid crystal display device typically includes an active matrix substrate, a color filter substrate, and a liquid crystal layer interposed therebetween, and further spacers are arranged between substrates to maintain the thickness (cell gap) of the liquid crystal layer.

A spherical spacer formed from plastics, inorganic materials, and the like, a column spacer formed from resin materials and the like, are known as the spacer. The column spacer is particularly excellent in high placement accuracy because it can be formed from a photosensitive resin by directly coating the resin on a substrate and then performing photolithography. This column spacer may be constituted by a black matrix layer (for example, refer to Patent Document 1). In addition to such a resin layer, the column spacer may be formed from a colored layer material and the like. That is, a multi-layer spacer is mentioned as the column spacer (for example, refer to Patent Document 2).

The color filter substrate is known to be typically produced in the following procedures.

A light-shielding layer that is formed from black matrix is formed between regions where a colored layer is to be formed later on a transparent substrate, first. Then, colored layers of red (R), blue (B), green (G), and the like, are successively formed at specific regions, respectively. Then, a transparent electrode (common electrode) for applying a voltage to a liquid crystal layer is formed over the entire substrate. Finally, a plurality of column (multi-layer) spacers are formed partly on the common electrode.

A liquid crystal display device is being rapidly developed, and improvements particularly in a method of forming a multi-layer spacer, a production method of a color filter substrate having a multi-layer spacer, and the like, are being particularly needed.

[Patent Document 1]
Japanese Kokai Publication No. 2003-228085
[Patent Documents 2]
Japanese Kokai Publication No. 2006-23733

DISCLOSURE OF INVENTION

The present invention has been made in view of the above-mentioned state of the art. The present invention has an object to provide: a production method of a color filter substrate, capable of efficiently producing a color filter substrate having a multi-layer spacer; a production method of a liquid crystal display device including a color filter substrate produced by such a production method; a color filter substrate preferably produced by such a production method; and a liquid crystal display device including such a color filter substrate.

The present inventors made various investigations of a method of efficiently producing a color filter substrate. The inventors noted the order of production steps of the color filter substrate. Then, the inventors found that the number of the production steps can be decreased compared with conventional production steps if a colored layer and a layer constituting a base of a multi-layer spacer are simultaneously formed from the same material, and then, a light-shielding layer and a top of the multi-layer spacer are simultaneously formed from the same material. As a result, the above-mentioned problems have been admirably solved, leading to completion of the present invention.

That is, the present invention is a production method of a color filter substrate including a colored layer, an electrode, a light-shielding layer, and a multi-layer spacer on a substrate, the production method including the steps of:
forming the colored layer and a base colored layer of the multi-layer spacer,
forming the electrode, and
forming the light-shielding layer and a top layer of the multi-layer spacer.

The present invention is mentioned below in more detail.

The production method of the color filter substrate of the present invention provides a production method of a color filter substrate including a colored layer, an electrode, a light-shielding layer, and a multi-layer spacer on a substrate. According to the production method of the present invention, a multi-layer spacer that is formed by stacking colored layer materials and the like, can be used as a column spacer for maintaining a cell gap, which allows that the colored layer for color display and the base colored layer of the multi-layer spacer can be formed in the same step. As a result, the production steps can be more efficiently performed. In the present description, the expression "in the same step" includes a case where two or more treatments are simultaneously performed and a case where two or more treatments are continuously performed during one step. In the latter case, the following embodiment is mentioned, for example: a treatment of forming a base colored layer of a multi-layer spacer is included in a treatment of forming a colored layer for color display. More specifically, a green colored layer for color display and a green base colored layer for a multilayer spacer are successively produced, and successively, a blue colored layer for color display and a blue base colored layer of the multi-layer spacer are successively produced. Thus, the respective treatments are performed in the same step, and thereby, for example, the colored layer for color display and the base colored layer of the multi-layer spacer can be formed by the same apparatus, and as a result, the production steps can be more efficiently performed.

The production method of the color filter substrate of the present invention includes the steps of: forming a colored layer and a base colored layer of a multi-layer spacer; forming an electrode; and forming a light-shielding layer and a top layer of the multi-layer spacer.

According to the production method of the present invention, the colored layer and the base colored layer of the multi-layer spacer can be formed in the same step. The multi-layer spacer formed by the production method of the present invention has a structure in which the top layer is formed on the base colored layer, but it may have other components. For example, an electrode and the like may be arranged between the base colored layer and the top layer. The base colored layer is not limited to a single layer, or it may be composed of a plurality of layers. The plurality of layers may be different in color.

According to the production method of the present invention, the light-shielding layer and the top layer of the multi-layer spacer can be formed in the same step. The top layer of the multi-layer spacer can be formed from a photosensitive resin and the like, and so, for example, by using the same photosensitive resin for the light-shielding layer and for the top layer of the multi-layer spacer, the two layers can be formed in the same step. That is, according to the production method of the present invention, the top layer can be formed from a material for the light-shielding layer.

According to the production method of the present invention, the step of forming the colored layer and the base colored layer of the multi-layer spacer, the step of forming the electrode, and the step of forming the light-shielding layer and the top layer of the multi-layer spacer are performed in this order, and so the produced color filter substrate includes the top layer (light-shielding layer) on the electrode, unlike a conventional color filter substrate. The production method of the present invention may or may not include other steps as long as it essentially includes these steps.

The respective components of the color filter substrate are formed by the production method of the present invention, and thereby the color filter substrate and a liquid crystal display device including such a color filter substrate can be produced through the reduced number of production steps compared with a conventional production method, which leads to reductions in production time (lead time), the number of photomasks, and production costs, and to an improvement in yield.

The present invention is also a production method of a liquid crystal display device including a liquid crystal layer between an active matrix substrate and the color filter substrate produced by the above-mentioned production method. The production method of the liquid crystal display device of the present invention is excellent in production efficiency because it includes the above-mentioned production method of the color filter substrate. The liquid crystal layer can be arranged between the color filter substrate and the active matrix substrate, for example, by the following methods: a liquid crystal layer material is dropped onto one substrate, and then the other substrate is attached thereto; and a pair of substrates is attached to each other, and then, a liquid crystal layer material is injected therebetween.

The present invention is a color filter substrate including a colored layer, an electrode, a light-shielding layer, and a multi-layer spacer on a substrate, wherein the multi-layer spacer has a structure in which a top layer is formed on a base colored layer, and the top layer is formed from a material for the light-shielding layer.

The color filter substrate of the present invention is excellent in productivity because it can be preferably produced by the above-mentioned production method. The multi-layer spacer the color filter substrate of the present invention includes has a structure in which the top layer is formed on the base colored layer, but it may have other components. For example, it may include an electrode and the like between the base colored layer and the top layer. The base colored layer is not limited to a single layer, and may be composed of a plurality of layers. The plurality of layers may be different in color.

The present invention is also a liquid crystal display device including: the above-mentioned color filter substrate; an active matrix substrate; and a liquid crystal layer between the color filter substrate and the active matrix substrate. The liquid crystal display device of the present invention includes the color filter substrate of the present invention, and further it is preferably produced by the above-mentioned production method, and so it is excellent in productivity.

Preferable embodiments of the present invention are mentioned in more detail below.

According to the production method of the liquid crystal display device of the present invention, it is preferable that the multi-layer spacer is formed to overlap with a thin film transistor in the active matrix substrate. Also in the liquid crystal display device of the present invention, it is preferable that the multi-layer spacer overlaps with a thin film transistor in the active matrix substrate. A region where the multi-layer spacer overlaps with a TFT (thin film transistor) is preferable as a region where the multi-layer spacer is arranged. The TFT is a semiconductor element that is used as a switching element in the active matrix substrate. According to the active matrix liquid crystal display device, in order to suppress deterioration of a TFT by light excitation induced when a semiconductor portion of the TFT is irradiated with external light, a light-shielding layer with a width larger than that the TFT is arranged in a region overlapping with the TFT in the color filter substrate to shield the entire TFT. In the present invention, the top layer of the multi-layer spacer has light-shielding property, and so the top layer is arranged so that it accurately covers the semiconductor portion of the TFT, and thereby deterioration of the TFT due to light excitation can be sufficiently suppressed even if the light-shielding layer has a small area. Thus, the multi-layer spacer of the present invention is arranged in the region overlapping with the TFT, which leads to an improvement in aperture ratio.

According to the production method of the liquid crystal display device of the present invention, it is preferable that the multi-layer spacer is formed to overlap with a light-shielding portion in the active matrix substrate. Also in the liquid crystal display device of the present invention, it is preferable that the multi-layer spacer overlaps with a light-shielding portion in the active matrix substrate. The multi-layer spacer formed in a liquid crystal display device produced by the production method of the present invention and in the liquid crystal display device of the present invention includes a material with light-shielding property. Accordingly, in order not to reduce the aperture ratio of a pixel, it is preferable that the multi-layer spacer is formed in a region where the light-shielding portion is formed in the active matrix substrate. One of the characteristics of the present invention is that the light-shielding layer and the top layer of the multi-layer spacer the color filter substrate includes are formed in the same step. So it is preferable that the multi-layer spacer overlaps with the light-shielding portion in the active matrix substrate, not with the region overlapping with the light-shielding layer in the color filter substrate.

It is preferable that the light-shielding portion is a storage capacitor wiring. It is preferable that the multi-layer spacer is arranged to overlap with a storage capacitor (Cs) wiring among the light-shielding portions. The Cs wiring is formed on the active matrix substrate side and forms a storage capacitance between itself and an electrode or wiring that faces the Cs wiring with an insulating film therebetween. Thereby, an electric potential in a display region can be auxiliary stored even if it is changed. In addition, the Cs wiring is typically formed from a material with light-shielding property. Accordingly, if the multi-layer spacer overlaps with the Cs wiring, the reduction in aperture ratio can be prevented. The region where the Cs wiring is formed is not a region overlapping with the light-shielding layer in the color filter substrate, which is preferable for the present invention.

It is preferable that the light-shielding portion is a gate wiring. It is preferable that the multi-layer spacer is arranged to overlap with a gate wiring among the light-shielding portions. The gate wiring is arranged on the active matrix substrate and applies a gate voltage to a semiconductor element. The gate wiring is typically formed from a material with light-shielding property. So the multi-layer spacer is arranged to overlap with the gate wiring, and thereby the reduction in aperture ratio can be prevented. The region where the gate wiring is formed is not a region overlapping with the light-shielding layer of the color filter substrate, for example, if the colored layers are formed to have a stripe structure, which is a pattern structure used when colored layers of the same color are adjacently arranged.

EFFECT OF THE INVENTION

According to the production method of the color filter substrate of the present invention, the colored layer and the layer constituting the base part of the multi-layer spacer can be formed in the same step, and the light-shielding layer and the layer constituting the top part of the multi-layer spacer can be formed in the same step, and thereby the color filter substrate can be produced by the smaller number of production steps than that of the conventional production method, which leads to reductions in production time (lead time), the number of photomasks, and production costs, and to an improvement in yield.

BEST MODES FOR CARRYING OUT THE INVENTION

The present invention is mentioned in more detail below with reference to Embodiments using drawings, but not limited thereto.

Embodiment 1

FIG. 1 is a cross-sectional view schematically showing a color filter substrate a liquid crystal display device produced in Embodiment 1 includes and showing a cross-section of the color filter substrate taken along line A-B in FIG. 2. As shown in FIG. 1, the color filter substrate in the liquid crystal display device produced in Embodiment 1 includes colored layers 4, 5, and 6 of red (A), green (G), and blue (B), respectively arranged on a transparent substrate 1. A common electrode 2 is formed between each two of the colored layers 4, 5, and 6 on the transparent substrate 1, and further on the colored layers 4, 5, and 6. On the common electrode 2 that is formed between each two of the colored layers 4, 5, and 6, a light-shielding layer (black matrix: BM) 3 for preventing light leakage from between the colored layers is arranged. The light-shielding layer (BM) 3 separates the red colored layer 4, the green colored layer 5, and the blue colored layer 6 from one another. The colored layers of the present Embodiment are not especially limited to the three colors, and colored layers of other colors of yellow, white, cyan, magenta, and the like, may be used in addition to those three.

In the present Embodiment, a multi-layer spacer 9 is used as means for maintaining a cell gap. As shown in FIG. 1, the color filter substrate of the present Embodiment has, in a region adjacent to the blue colored layer 6, a structure in which a green colored layer 5a and a blue colored layer 6a that are base colored layer, the common electrode 2, and a top layer 7 are stacked in this order. The top layer 7 is constituted by a BM that is a material for a light-shielding layer 3. The colored layers constituting the multi-layer spacer 9 are not especially limited to green and blue colored layers, and may be red and blue colored layers, or red and green colored layers.

According to the present Embodiment, an active matrix substrate 8 is arranged to face the color filter substrate, and between the two substrates, a liquid crystal layer 10 is arranged. The active matrix substrate 8 includes a gate wiring, a data wiring, a Cs wiring, a TFT that is a switching element, a pixel electrode, and the like, for controlling driving of the liquid crystal layer 10. A plurality of the gate wirings and a plurality of the data wirings are arranged to be intersect with each other and to form a matrix structure. The Cs wiring is arranged between the gate wirings to extend in an extending direction of the gate wiring. In a region surrounded by the gate wirings and the data wirings, the pixel electrode is arranged with an interlayer insulating film between itself and the gate and data wirings. At an intersection of the gate wiring with the data wiring, the TFT is arranged, and the TFT controls conduction of a signal that is fed from the data wiring based on a signal that is fed from the gate wiring. The TFT and the pixel electrode are electrically connected to each other through a contact hole that is formed in the interlayer insulating film. A voltage is applied between the pixel electrode of the active matrix substrate 8 and the common electrode 2 of the color filter substrate, and thereby an electrical field is generated in the liquid crystal layer 10 and liquid crystal molecules are aligned. As a result, a refractive index of light that transmits the liquid crystal layer 10 is changed. A polarizing plate is arranged on surfaces on the side opposite to the liquid crystal layer side, each of the color filter substrate and the active matrix substrate 8. On-off of the liquid crystal display device is controlled by functions of the polarizing plates and the above-mentioned change of the refractive index of light.

FIG. 2 is a plan view schematically showing the color filter substrate the liquid crystal display device produced in Embodiment 1 includes. As shown in FIG. 2, on the surface of the color filter substrate, the colored layers 4, 5, and 6 of red, green, and blue, and the light-shielding layer (BM) 3 that surrounds each of the colored layers 4, 5, and 6, are arranged. These colored layers 4, 5, and 6 are arranged to each face the corresponding pixel electrode of the opposite active matrix substrate B. The light-shielding layer 3 overhangs a region where a TFT 50 is to be formed so as to prevent deterioration of the TFT 50.

In the present Embodiment, the multi-layer spacer 9 is arranged in a region overlapping with the TFT 50. The multi-layer spacer 9 in the present Embodiment includes the top layer 7 that is formed from a BM, and so such a BM with a small area is enough to light-shield a channel portion of the TFT 50. As a result, the aperture ratio can be improved. This embodiment is mentioned below with reference to FIGS. 3(a) and 3(b). FIG. 3 is a schematic cross-sectional view shown in order to more specifically explain an embodiment where the top layer in the color filter substrate overlaps with the TFT in the active matrix substrate in accordance with the present Embodiment. FIG. 3(a) shows that in accordance with a conventional embodiment. FIG. 3(b) shows that in accordance with this Embodiment. As shown in FIG. 3(a), if in a color filter substrate, a light-shielding layer 113 is formed on a transparent substrate 111, and if a TFT 250 is formed on a transparent substrate 121 in an active matrix substrate, a BM having a width T1 is generally arranged as the light-shielding layer 113 in the entire region overlapping with the TFT 250 in order to prevent deterioration of the TFT 250 by light excitation induced when a semiconductor part of the TFT 250 is irradiated with external light 180, conventionally. In contrast, according to the present Embodiment, if the TFT 50 is formed on the transparent substrate 21 in the active matrix substrate and if the top layer 7 (BM) formed on the colored layers 5a and 6a have light-shielding property, as shown in FIG. 3(b), the top layer 7 can be arranged to cover a channel region 50a of the TFT, and so deterioration of the TFT 50 by light excitation induced by external light 80 can be sufficiently suppressed even if the width (area) of the light-shielding portion (top layer) is not larger than the width of the TFT. Therefore, according to the present Embodiment, the width of the light-shielding layer can be decreased from T1 to T2, and as a result, the embodiment in which the aperture ratio can be improved compared with the conventional embodiment is obtained.

The multi-layer spacer 9 of the present Embodiment is formed adjacent to the blue colored layer 6, but may be formed in a region adjacent to the red colored layer 4 or the green colored layer 5. As long as a cell gap can be maintained over the entire color filter substrate, the spacer 9 may not be necessarily formed in any of a pair of three colored layers.

The production methods of the color filter substrate and the liquid crystal display device in accordance with Embodiment 1 are mentioned in more detail below.

FIGS. 4-1 to 4-3 are schematic views showing steps of producing the color filter substrate in accordance with this Embodiment and each show a schematic cross-section of the color filter substrate in the corresponding production step.

As shown in FIG. 4-1, the red colored layer 4, the green colored layer 5, and the blue colored layer 6 are successively formed at specific positions, respectively, on the transparent substrate 1. At this time, in a region adjacent to the blue colored layer 6 where the multi-layer spacer 9 is to be formed, two layers of the green colored layer 5a and the blue colored layer 6a that constitute a base colored layer are stacked. The multi-layer spacer 9 is arranged in a region overlapping with the TFT 50 in the active matrix substrate 8. A glass, plastic substrate, or the like, can be used as the transparent substrate 1, for example. A photosensitive resin (color resist) containing the corresponding pigment can be used for the colored layers 4, 5, 6, 5a, and 6a. The colored layers 4, 5, 6, 5a, and 6a are preferably formed by photolithography using the color resist.

As shown in FIG. 4-2, the common electrode 2 is formed over the entire surface. A metal oxide with transparency such as ITO (indium tin oxide) and IZO (indium zinc oxide) can be used for example, as the common electrode 2. The common electrode 2 can be formed by sputtering and the like.

Then, as shown in FIG. 4-3, the light-shielding layer 3 and the top layer 7 are formed. A black pigment-containing photosensitive resin (BM) can be used as a material for the layers 3 and 7. It is preferable that the light-shielding layer 3 and the top layer 7 are formed by photolithography which allows the layers to be arranged at accurate positions. Further, the use of the same material allows the layers 3 and 7 to be formed in the same step. The light-shielding layer 3 of the present Embodiment is arranged between each two of the colored layers 4, 5, and 6. The top layer 7 is arranged in a region where the green colored layer 5, the blue colored layer 6, and the common electrode 2 are overlapped with one another.

According to the present Embodiment, the light-shielding layer 3 and the top layer 7 can be formed in the same step, and the number of the production steps for forming the layers can be decreased compared with the conventional embodiment, which allows reductions in production time (lead time), the number of photomasks, and production costs, and to an improvement in yield.

Then, the active matrix substrate 8 is produced. The active matrix substrate 8 can be produced in the following procedures, for example: gate wirings, data wirings, Cs wirings, TFTs that are switching elements, are pattern-formed by photolithography; an interlayer insulating film is formed to cover these wirings, and the like; a part of the interlayer insulating film is provided with a contact hole; thereon, pixel electrodes are arranged; and the TFTs are connected to the pixel electrodes, respectively. The gate wirings, the data wirings, and the Cs wirings can be easily produced using a material with light-shielding property such as aluminum (Al), silver (Ag), tantalum nitride (TaN), titanium nitride (TiN), and molybdenum nitride (MoN).

It is preferable from viewpoint of alignment control of liquid crystal molecules that an alignment film formed from polyimide and the like for aligning liquid crystal molecules is arranged on surface that are in contact with the liquid crystal layer 10, each of the color filter substrate and the active matrix substrate 8.

Then, a liquid crystal material is injected into and seals a space between the color filter substrate and the active matrix substrate 8 to form a liquid crystal layer. Further, a polarizing plate is arranged on a surface on the opposite side of the liquid crystal layer 10 side, each of the color filter substrate and the active matrix substrate 8. Then, a driving integrated circuit (driver) and if the device is a transmissive or transflective liquid crystal display device, a backlight are further arranged. As a result, the liquid crystal display device is completed.

Embodiment 2

FIG. 5 is a cross-sectional view schematically showing a color filter substrate a liquid crystal display device produced in Embodiment 2 includes. As shown in FIG. 5, the color filter substrate in the liquid crystal display device produced in Embodiment 2 includes three colored layers 14, 15, and 16 of red, green, and blue, respectively on a transparent substrate 11. A common electrode 12 is formed between each two of the colored layers 14, 15, and 16 on the transparent substrate 11, and further on the colored layers 14, 15, and 16. On the common electrode 12 that is formed between each two of the colored layers 14, 15, and 16, a light-shielding layer (BM) 13 for preventing light leakage from between the colored layers is arranged.

Differently from Embodiment 1, as components constituting a multi-layer spacer 19 that is used as means for maintaining a cell gap, not only a green colored layer 15a and a blue colored layer 16a, a red colored layer 14a is also included, and the multi-layer spacer 19 has a structure in which the red colored layer 14a, the green colored layer 15a, the blue colored layer 16a, the common electrode 12, and the top layer (BM) 17 are stacked in this order. The present Embodiment is preferably adopted, for example, if in view of the thicknesses of the top layer 17 and the liquid crystal layer 20, the embodiment of the multi-layer spacer of Embodiment 1 can not provide a cell gap optimum for a retardation of light passing through the liquid crystal layer 20. The cell gap can be also optimized, for example, by adjusting formation of an electrode, a thickness of each member constituting the multi-layer spacer.

The color filter substrate and the liquid crystal display device produced in Embodiment 2 are the same as in Embodiment 1 except that the above-mentioned multi-layer spacer 19 includes the red colored layer 14*a*.

Embodiment 3

FIG. 6 is a plan view schematically showing a color filter substrate a liquid crystal display device produced in Embodiment 3 includes. As shown in FIG. 6, on the surface of the color filter substrate, colored layers 24, 25, and 26 of red, green, and blue, and a light-shielding (BM) 23 surrounding these colored layers 24, 25, and 26 are arranged. These colored layers 24, 25, and 26 are arranged to each face the corresponding pixel electrode of the opposite active matrix substrate.

Differently from Embodiment 1, a multi-layer spacer 29 including a top layer 27 is arranged not in a region where a TFT is to be formed but in a region overlapping with a storage capacitor (Cs) wiring 60 in the active matrix substrate, shown by the dotted line in FIG. 6.

The color filter substrate and the liquid crystal display device produced in Embodiment 3 is the same as in Embodiment 1, except that the multi-layer spacer 29 is arranged in the region overlapping with not the TFT but the Cs wiring 60.

Embodiment 4

FIG. 7 is a plan view schematically showing a color filter substrate a liquid crystal display device produced in Embodiment 4 includes. As shown in FIG. 7, a light-shielding layer (BM) 33 is formed in a stripe pattern, not in a matrix pattern, unlike Embodiments 1 to 3. That is, if a colored layer of the same color (a red colored layer 34, a green colored layer 35, or a blue colored layer 36) is arranged in pixels that are adjacent each other with a gate wiring therebetween, the light-shielding layer (BM) 33 is not formed on the gate wiring and so the same colored layer is formed in a line over the pixels adjacent each other. According to such an embodiment, the aperture ratio can be improved.

If the light-shielding layer (BM) 33 is formed in a stripe pattern, the following three embodiments are mentioned as an arrangement position of the multi-layer spacer. FIGS. 7(*a*) to 7(*c*) are plan views schematically showing a color filter substrate showing an arrangement position of a multi-layer spacer when the light-shielding layer (BM) is formed in a stripe pattern. FIG. 7(*a*) shows an embodiment in which a multi-layer spacer 39 including a top layer 37 is arranged in a region overlapping with a TFT 150. FIG. 7(*b*) shows an embodiment in which the multi-layer spacer 39 including a top layer 37 is arranged in a region overlapping with a Cs wiring 160. FIG. 7(*c*) shows an embodiment in which the multi-layer spacer 39 including a top layer 37 is arranged in a region overlapping with a gate wiring 170.

Also according to any of these embodiments, the multi-layer spacer 39 including the top layer 37 is arranged in a region where a component formed from a material with light-shielding property is arranged on the active matrix substrate. So the color filter substrate can be produced without reduction in aperture ratio.

Embodiment 5

FIG. 8 is a plan view schematically showing a color filter substrate a liquid crystal display device produced in Embodiment 5 includes. As shown in FIG. 8, the color filter substrate in the present Embodiment includes a red colored layer 44, a green colored layer 45, and a blue colored layer 46, partitioned by a light-shielding layer 43, and also in every region overlapping with a TFT, a multi-layer spacer 49 including a top layer 47 is formed. The multi-layer spacer 49 of the present Embodiment is arranged to overlap with the TFT, and thereby the aperture ratio can be improved. So by increasing the number of the spacers overlapping with the TFT, the aperture ratio can be more improved. FIG. 8 shows that the light-shielding (BM) layer 43 is formed in a stripe pattern, but not limited thereto. The light-shielding (BM) layer 43 may be formed in a matrix pattern shown in Embodiments 1 to 3.

Embodiments 1 to 5 may be appropriately adopted in a combination if necessary, which brings optimum advantages.

Comparative Embodiment 1

FIG. 9 is a cross-sectional view schematically showing a color filter substrate a conventional liquid crystal display device produced in Comparative Embodiment 1 includes. As shown in FIG. 9, according to the color filter substrate the liquid crystal display device produced in Comparative Embodiment 1 includes, a light-shielding layer 103 for preventing light leakage between each two of the colored layers 104, 105, and 106 is arranged on a transparent substrate, and in regions surrounded by the light-shielding layer 103, colored layers 104, 105, and 106 of red, green, and blue, are arranged. On the light-shielding layer 103, and the colored layers 104, 105, and 106, a common electrode 102 is arranged.

In this Comparative Embodiment, a multi-layer spacer 109 as means for maintaining a cell gap is used. As shown in FIG. 9, according to the color filter substrate produced in this Comparative Embodiment, the multi-layer spacer 109 is arranged in a region adjacent to the blue colored layer 106. The multi-layer spacer 109 has a structure in which the light-shielding layer 103, a green colored layer 105*a*, a blue colored layer 106*a*, the common electrode 102, and a top layer 107 are stacked in this order. The common electrode 102 is formed from ITO. The top layer 107 is formed from a transparent photosensitive resin. An active matrix substrate 108 is arranged to face the color filter substrate, and therebetween, a liquid crystal layer 110 is arranged.

Production methods of the color filter substrate and the liquid crystal display device in accordance with Comparative Embodiment 1 are mentioned in more detail below.

FIGS. 10-1 to 10-4 are schematic views showing steps of producing the color filter substrate in accordance with Comparative Embodiment and each schematically shows a cross-section of the color filter substrate in the corresponding production step.

As shown in FIG. 10-1, a light-shielding layer (BM) 103 for preventing light leakage from between each two of the colored layers 104, 105, and 106 is formed on a transparent substrate 101 by dry film process. Then, as shown in FIG. 10-2, a red colored layer 104, a green colored layer 105, and a blue colored layer 106 are successively formed between the BMs 103. At this time, in a region adjacent to the blue colored layer 106 where the multi-layer spacer 109 is to be formed, two layers of the green colored layer 105*a* and the blue colored layers 106*a* are stacked. Then, as shown in FIG. 10-3, the common electrode 102 is formed over the entire surface by sputtering. Then, as shown in FIG. 10-4, the top layer 107 is formed on the blue colored layer 106*a* constituting the multi-layer spacer 109 by dry-film process.

Comparison between the production method in Embodiment 1 and that in Comparative Embodiment 1 shows that the number of production steps in the production method of Comparative Embodiment 1 is larger than that of Embodiment 1. So compared with the conventional embodiment, according to the production methods in Embodiments 1 to 5, a production time (lead time), the number of photomasks, and production costs can be reduced, and a yield can be improved.

Further, an aperture ratio can be increased, and as a result, a liquid crystal display device with high luminance can be produced.

The present application claims priority to Patent Application No. 2007-154125 filed in Japan on Jun. 11, 2007 under the Paris Convention and provisions of national law in a designated State, the entire contents of which are hereby incorporated by reference.

BRIEF DESCRIPTION OF DRAWINGS

FIG. 1 is a cross-sectional view schematically showing a color filter substrate the liquid crystal display device produced in Embodiment 1 includes.

FIG. 2 is a plan view schematically showing the color filter substrate the liquid crystal display device produced in Embodiment 1 includes.

[FIG. 3]
FIG. 3 is a cross-sectional schematic view more specifically showing an embodiment where the top layer in the color filter substrate overlaps with the TFT in the active matrix substrate in accordance with Embodiment 1.

FIG. 3(a) shows that in accordance with a conventional embodiment.

FIG. 3(b) shows that in accordance with Embodiment 1.

[FIG. 4-1]
FIG. 4-1 is a schematic view showing steps of producing the color filter substrate in accordance with Embodiment 1 and shows the substrate in which a colored layer and a base colored layer have been formed.

[FIG. 4-2]
FIG. 4-2 is a schematic view showing steps of producing the color filter substrate in accordance with Embodiment 1 and shows the substrate in which a common electrode has been formed.

[FIG. 4-3]
FIG. 4-3 is a schematic view showing a production procedure of the color filter substrate in Embodiment 1 and shows the substrate in which a light-shielding layer and a top layer have been formed.

FIG. 5 is a cross-sectional view schematically showing a color filter substrate a liquid crystal display device produced in Embodiment 2 includes.

FIG. 6 is a plan view schematically showing a color filter substrate a liquid crystal display device produced in Embodiment 3 includes.

FIG. 7 is a plan view schematically showing a color filter substrate a liquid crystal display device produced in Embodiment 4 includes.

FIG. 7(a) shows an embodiment in which a multi-layer spacer is arranged in a region overlapping with a TFT.

FIG. 7(b) shows an embodiment in which a multi-layer spacer is arranged in a region overlapping with a Cs wiring.

FIG. 7(c) shows an embodiment in which a multi-layer spacer is arranged in a region overlapping with a gate wiring.

FIG. 8 is a plane view schematically showing a color filter substrate a liquid crystal display device produced in Embodiment 5 includes.

FIG. 9 is a cross-sectional view schematically showing a color filter substrate a liquid crystal display device produced in Comparative Embodiment 1 includes.

[FIG. 10-1]
FIG. 10-1 is a schematic view showing a production procedure of the color filter substrate in Comparative Embodiment 1 and shows the substrate in which a light-shielding layer has been formed.

[FIG. 10-2]
FIG. 10-2 is a schematic view showing steps of producing the color filter substrate in accordance with Comparative Embodiment 1 and shows the substrate in which a colored layer and a base colored layer have been formed.

[FIG. 10-3]
FIG. 10-3 is a schematic view showing steps of producing the color filter substrate in accordance with Comparative Embodiment 1 and shows the substrate in which a common electrode has been formed.

[FIG. 10-4]
FIG. 10-4 is a schematic view showing steps of producing the color filter substrate in accordance with Comparative Embodiment 1 and shows the substrate in which a top layer has been formed.

Figure 1:
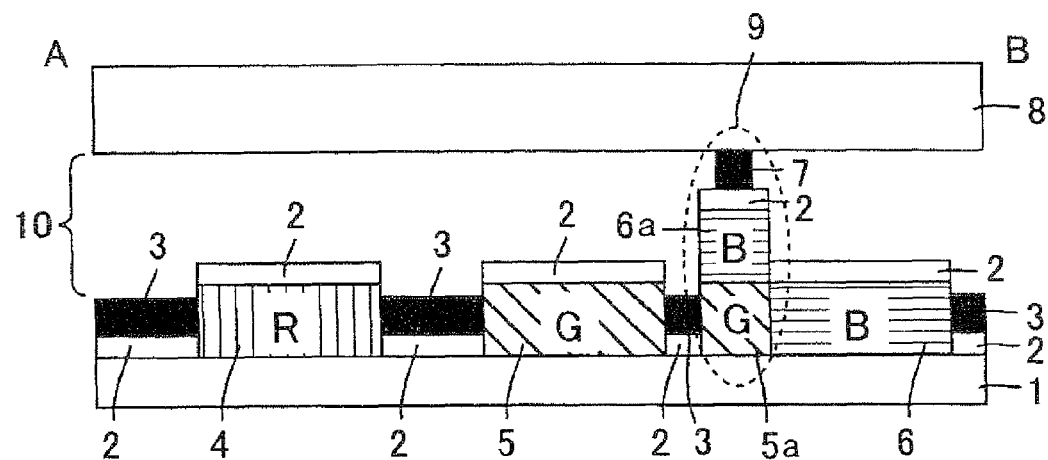
[FIG. 1]
Figure 2:
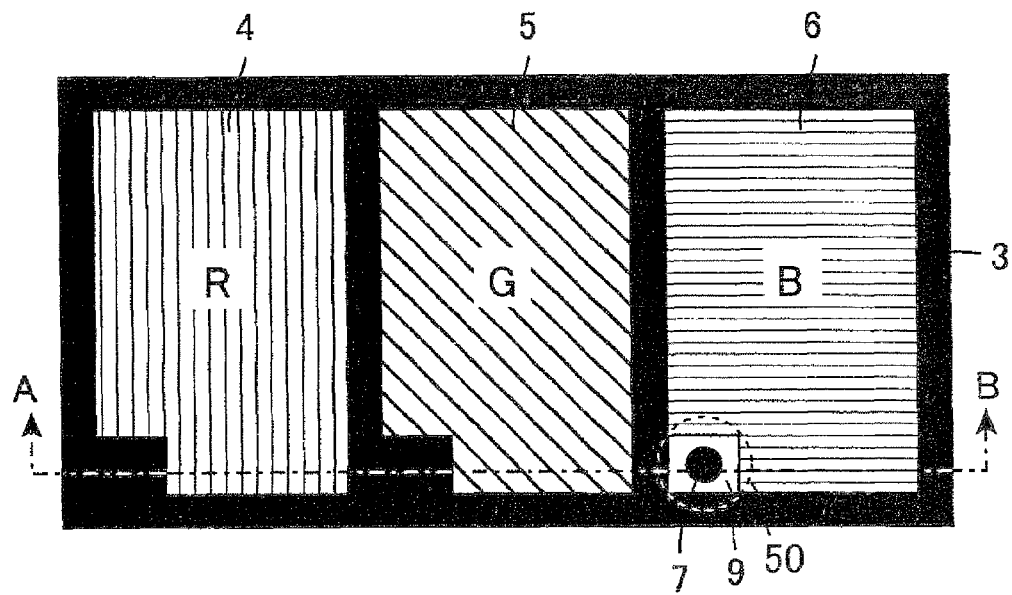
[FIG. 2]
Figures 2, 4:
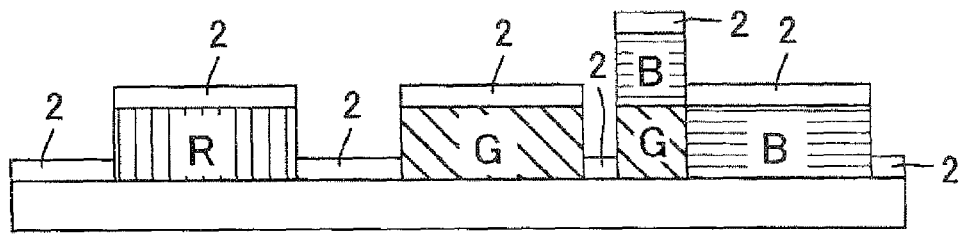
Figures 3, 4:
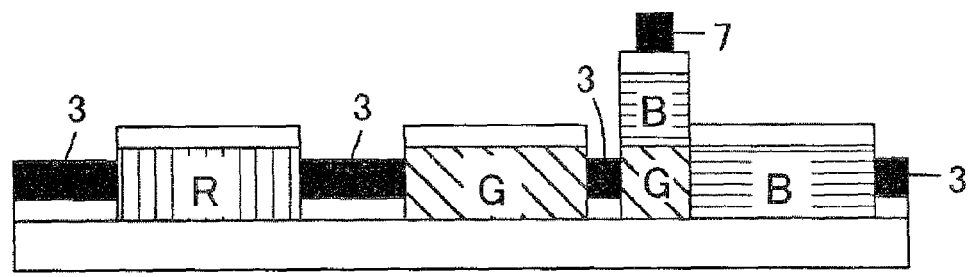
Figure 5:
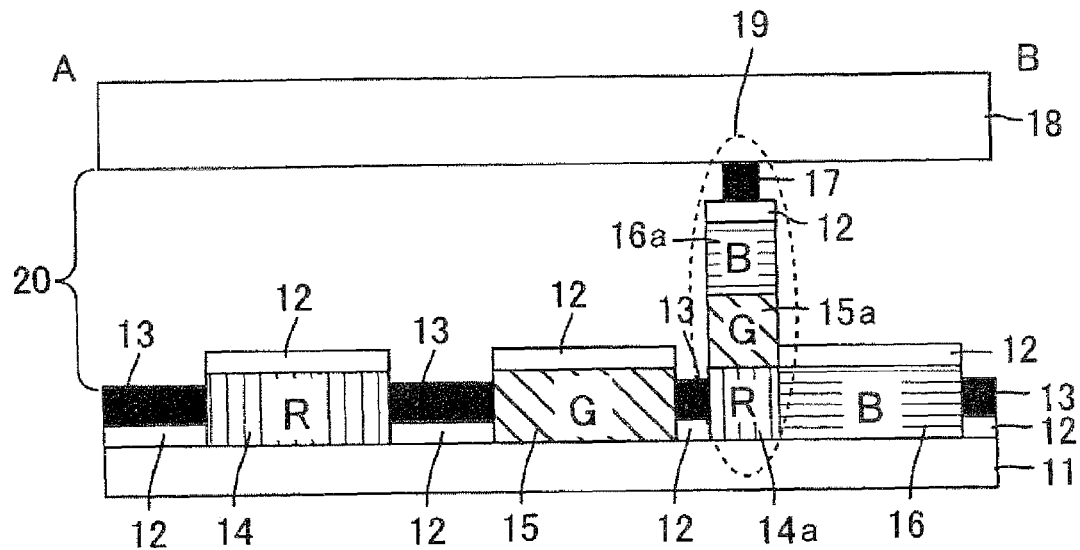
[FIG. 5]
Figure 6:
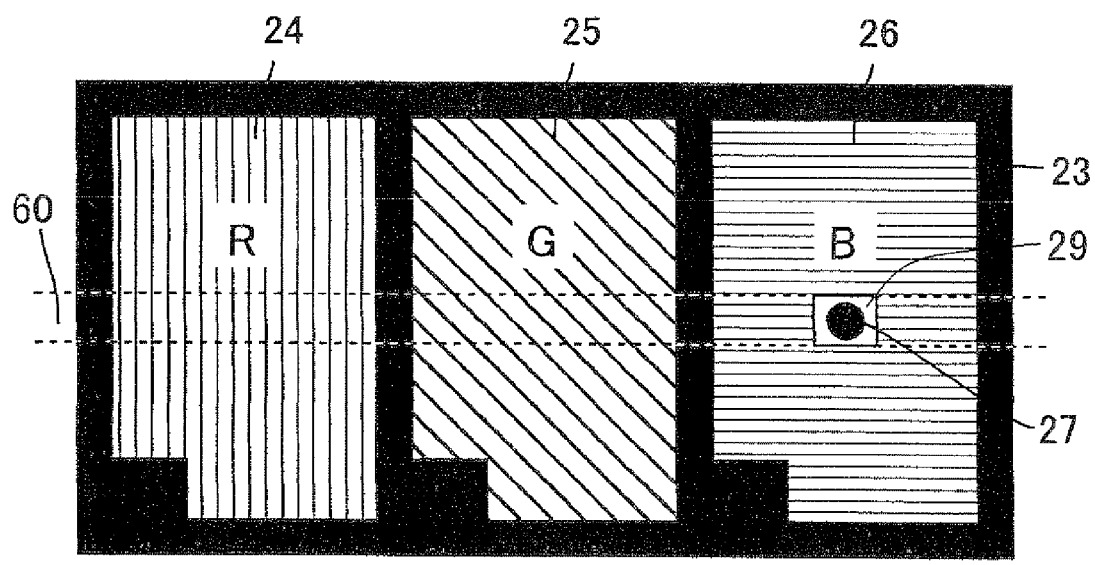
[FIG. 6]
Figure 7:
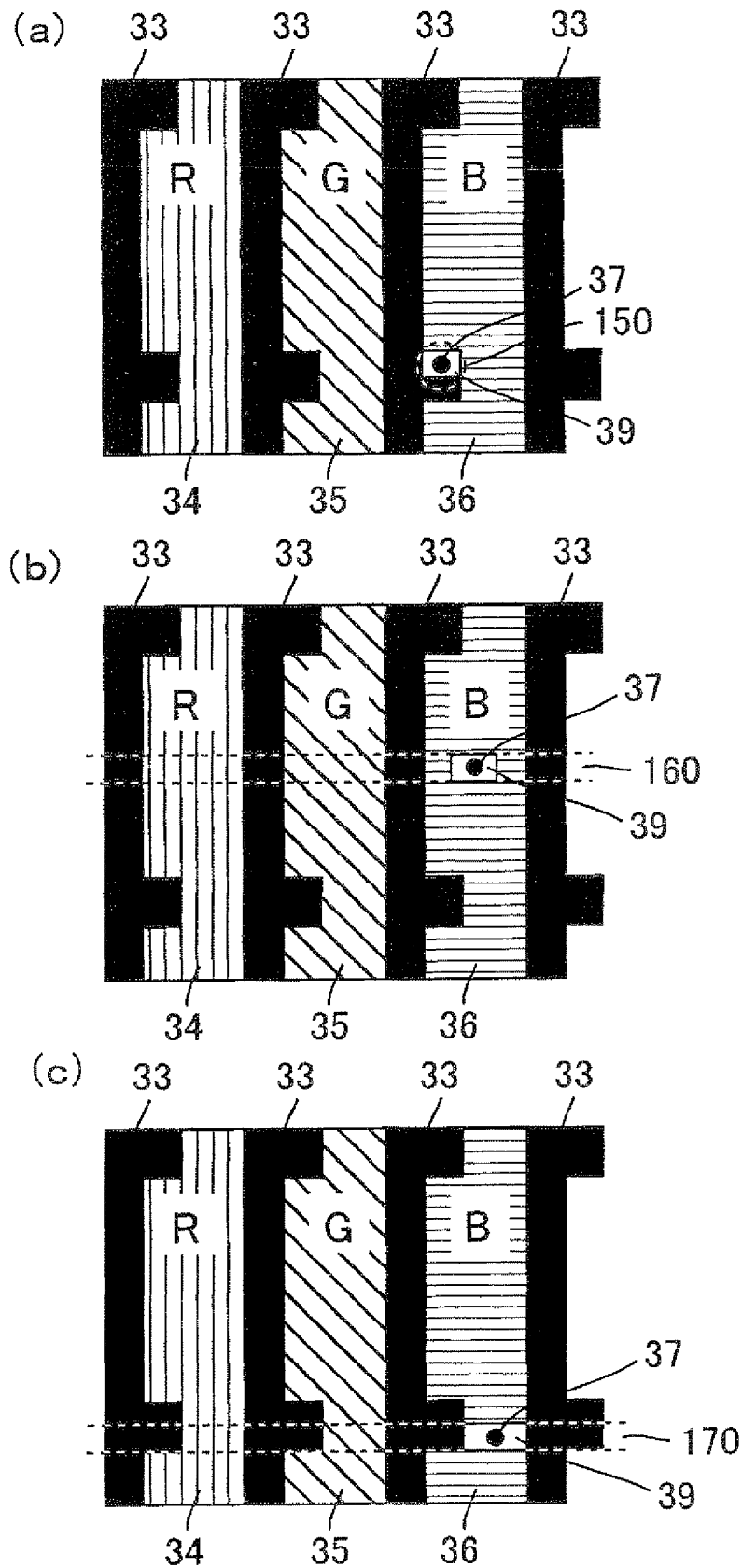
[FIG. 7]
Figure 8:
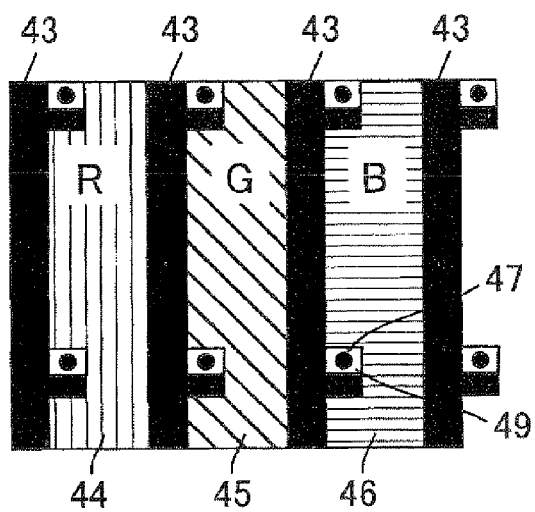
[FIG. 8]
Figure 9:
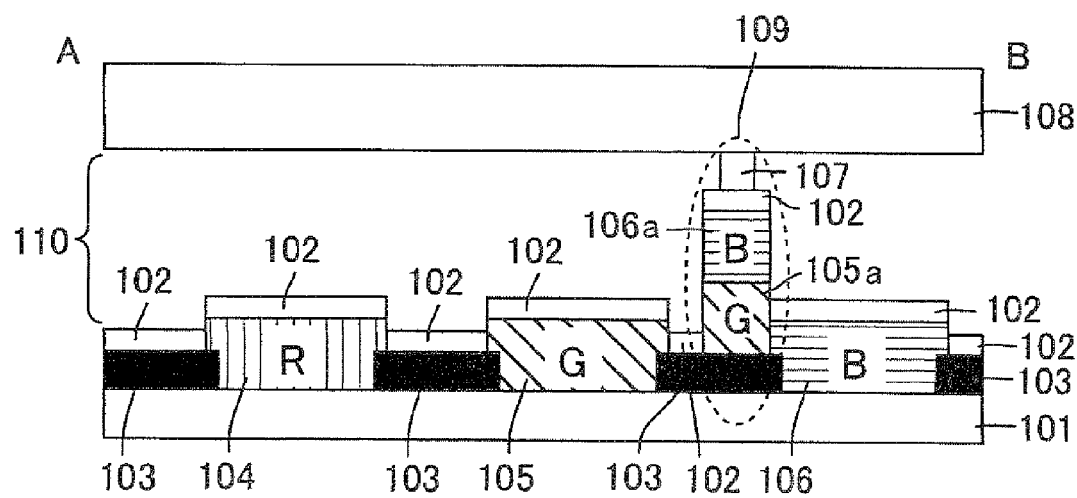
[FIG. 9]
Figures 1, 10:
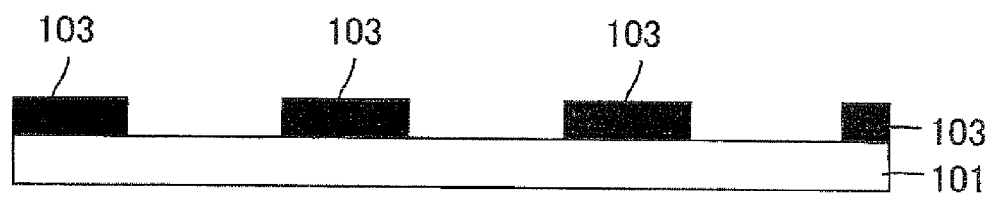
Figures 2, 10:
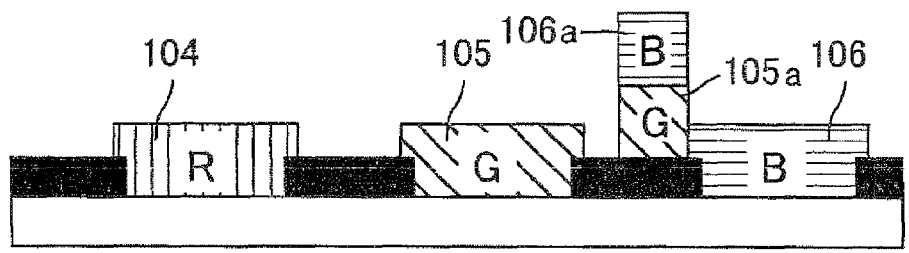
Figures 3, 10:
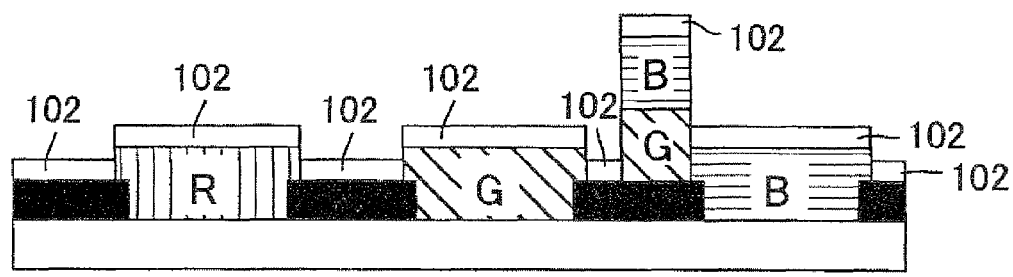
Figures 4, 10:
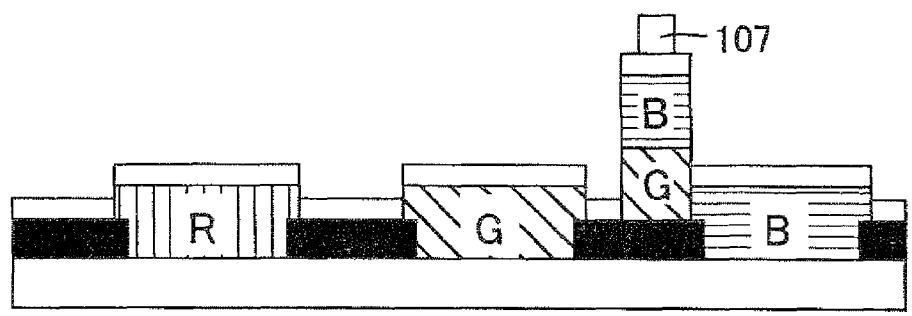

EXPLANATION OF NUMERALS AND SYMBOLS 1, 11, 21, 101, 111, 121: Substrate
2, 12, 102: Common electrode
3, 13, 23, 33, 43, 103, 113: Light-shielding layer (BM)
4, 14, 24, 34, 44, 104: Red colored layer
5, 15, 25, 35, 45, 105: Green colored layer
6, 16, 26, 36, 46, 106: Blue colored layer
14a: Red colored layer (multi-layer spacer)
5a, 15a, 105a: Green colored layer (multi-layer spacer)
6a, 16a, 106a: Blue colored layer (multi-layer spacer)
7, 17, 27, 37, 47: Top layer (BM)
107: Top layer (Transparent resin)
8, 18, 108: Active matrix substrate
9, 19, 29, 39, 49, 109: Multi-layer spacer
10, 20, 110: Liquid crystal layer
50, 150, 250: TFT
50a: Channel portion
60, 160: Storage capacitor (Cs) wiring (light-shielding portion)
170: Gate wiring (light-shielding portion)
80, 180: External light

The invention claimed is:
1. A production method for making a color filter substrate including colored layers, an electrode, a light-shielding layer, and a multi-layer spacer on a substrate, the production method comprising:
   forming the colored layers and a base colored layer of the multi-layer spacer on the substrate,
   after forming the colored layers and the base colored layer, forming the electrode over the substrate, the colored layers and the base colored layer, and
   after forming the electrode, forming the light-shielding layer on the electrode on the substrate between the colored layers and forming a top layer of the multi-layer spacer on the electrode on the base colored layer via a common step so that the light-shielding layer and the top layer of the multi-layer spacer comprise a same material.
2. A production method of a liquid crystal display device including a liquid crystal layer between an active matrix substrate and the color filter substrate produced by the production method according to claim 1.

3. The production method of the liquid crystal display device according to claim 2, wherein the multi-layer spacer is formed to overlap with a thin film transistor in the active matrix substrate.

4. The production method of the liquid crystal display device according to claim 2, wherein the multi-layer spacer is formed to overlap with a light-shielding portion in the active matrix substrate.

5. The production method of the liquid crystal display device according to claim 4, wherein the light-shielding portion is a storage capacitor wiring.

6. The production method of the liquid crystal display device according to claim 4, wherein the light-shielding portion is a gate wiring.

7. A color filter substrate comprising:
colored layers,
an electrode,
a light-shielding layer,
a multi-layer spacer on a substrate, wherein the multi-layer spacer has a structure in which a base colored layer, the electrode, and a top layer are formed in this order toward an opposite side of a substrate side, and the top layer is formed from a material for the light-shielding layer,
the electrode is formed on the colored layers and on the substrate between the colored layers,
the light-shielding layer is formed on the electrode on the substrate between the colored layers.

8. A liquid crystal display device comprising: the color filter substrate according to claim 7; an active matrix substrate; and a liquid crystal layer between the color filter substrate and the active matrix substrate.

9. The liquid crystal display device according to claim 8, wherein the multi-layer spacer overlaps with a thin film transistor in the active matrix substrate.

10. The liquid crystal display device according to claim 8, wherein the multi-layer spacer overlaps with a light-shielding portion in the active matrix substrate.

11. The liquid crystal display device according to claim 10, wherein the light-shielding portion is a storage capacitor wiring.

12. The liquid crystal display device according to claim 10, wherein the light-shielding portion is gate wiring.

* * * * *